Feb. 22, 1966　　　　TAKAYUKI KATO　　　　3,236,084
APPARATUS FOR DELIVERING STEEL BAR SECTIONS
ONTO THE COOLING BED OF A BAR MILL
Filed June 13, 1963
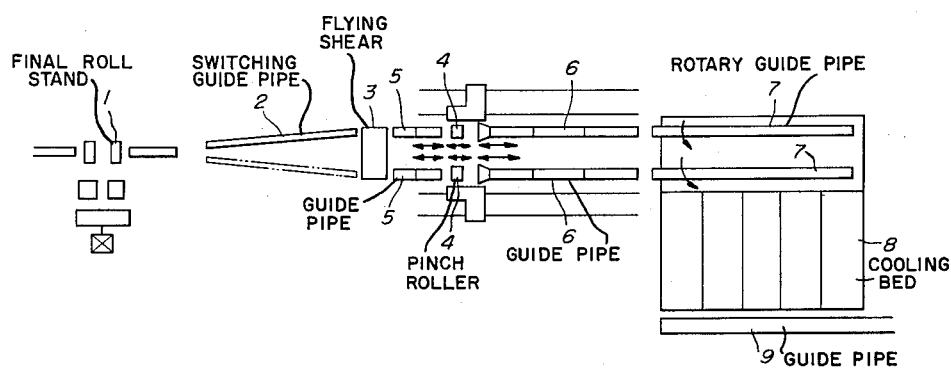
INVENTOR
TAKAYUKI KATO
BY Paul M. Craig, Jr.
ATTORNEY 3,236,084
APPARATUS FOR DELIVERING STEEL BAR SECTIONS ONTO THE COOLING BED OF A BAR MILL
Takayuki Kato, Hitachi-shi, Japan, assignor to Hitachi Ltd., Tokyo, Japan, a corporation of Japan
Filed June 13, 1963, Ser. No. 287,712
2 Claims. (Cl. 72—228)

The present invention relates to apparatus for delivering bars onto the cooling bed in a bar mill and particularly to those arranged to conduct steel bars which are hot-rolled and cut to a predetermined length to the cooling bed.

In bar mills, steel bars are cut by an appropriate cutting machine into sections having a predetermined length. The cut sections are directed through pinch rollers located on the delivery side of the cutting machine and onto a cooling bed under the drive of such rollers and cooled.

In the past, sections cut to a length have been conducted from the cutting machine to the cooling bed over a roller table or through guide pipes. The prior art table-roller system is disadvantageous since the bar sections are subjected to the cutting action of the rollers along cross sections therethrough through only to limited depths; furthermore, when the bar sections are cut into small sections and particularly when those sections are driven at higher velocities, they are apt to be deflected off the predetermined course over the table even by the slightest obstacles that might possibly exist on the table. On the other hand, the prior art guide-pipe type delivering system involves the difficulty that any variation in velocity, at which bar sections are driven forward, may cause stoppage of the bar sections midway of the path through the guide pipe, thus precluding delivery of any succeeding sections.

The present invention has for its object to provide an improved guide-pipe type apparatus usable in a bar mill for delivering bar sections onto the cooling bed thereof. According to the present invention, a bar delivering apparatus of the kind described comprises a flying shear machine for cutting bars delivered from the final roll stand of the bar mill into sections, pinch rollers adjustable in their position along the path of bar sections, first extensible and contractible guide pipes for directing the bar sections from the flying shear machine to the pinch rollers, rotary guide pipes mounted on the cooling bed, and second extensible and contractible guide pipes for directing the bar sections delivered from the pinch rollers into said rotary guide pipes.

The foregoing and other objects, features and advantages of the present invention will become apparent from the following description when taken in conjunction with the accompanying drawing, which includes a single figure schematically illustrating one embodiment of the invention.

In the drawing, reference numeral 1 designates the final roll stand of a bar mill, 3 a flying shear machine, 2 a switching guide pipe arranged between the final roll stand 1 and the shearing machine 3, for the combined purpose of directing the steel bar to the shears 3 and selecting the path of the bar therethrough, and 4 a pair of pinch roller stands located on the delivery side of the flying shear machine 3 for the purpose of straightening any bends or other irregularities of the bar sections possibly occurring therein during the shearing operation while at the same time driving the sections forward. The pinch rollers 4 are adjustable in their position along the path of the bar sections by conventional means not shown. Numerals 5 and 6 each indicate a pair of extensible and contractible guide pipes of any known construction and arranged between the shears 3 and pinch rollers 4 and between the pinch rollers 4 and a cooling bed 8, respectively. Each of the extensible and contractible guide pipes 5 and 6 is either divided into several sections detachably connected to each other to allow the effective length of the guide pipe to be varied widely as desired or takes the form of a single expansion pipe. These guide pipes 5 and 6 serve to direct the bar sections from the shears 3 to the pinch rollers 4 and further to the cooling bed 8. Numeral 7 indicates rotary guide pipes mounted on the cooling bed 8 in end-to-end relation to the respective guide pipes 6. The rotary guide pipes 7 are each trough-like, i.e., open on one side and arranged so as to be rotatable in a circumferential direction, for example, by pneumatic piston-and-cylinder means to transfer the bar sections onto the cooling bed 8 by gravity when the open side of the rotary guide pipe 7 faces in the downward direction.

Numeral 9 indicates a guide pipe adapted to receive the cooled bar sections from the table 8 when the latter is tilted for conveyance of such sections to the exterior.

In operation of the apparatus described above, the bar delivered from the final roll stand 1 is directed through the switching guide pipe 2 into the shearing machine 3, where the bar is cut into sections having a predetermined length. The bar sections are directed through the guide pipes 5 to be engaged by the pinch rollers 4, which are rotated at a speed in synchronism with the rolling speed of the mill to deliver the sections into guide pipes 6. Advancing through the guide pipes 6, the bar sections enter the rotary guide pipes 7, which are turned in a circumferential direction as soon as the fact that the bar sections have entirely entered the guide pipes 7 is confirmed, to cause the sections to fall onto the cooling bed 8.

In this connection, consideration must be given to the magnitude of the driving force applied to the bar sections by the pinch rollers 4 and the resulting propelling velocity of the bar sections. The propelling speeds of the cut bar sections which have passed through the pinch rollers 4 are restricted to a certain speed by the action of the pinch rollers 4 even though the cut bar sections may have had respectively different speeds before entering the pinch rollers 4. Therefore, the lengths of the second guide pipes 6 are simply adjusted taking into consideration the necessary and desirable bar propelling speed for each cut bar section and the friction between the cut bar sections and the second guide pipes 6. If the magnitude of the driving force of the pinch rollers 4 is larger than a predetermined value, then the velocity of the cut bar sections becomes larger, which would result, for example, in crashing of a bar section against the end of the rotary guide pipe 7, thus having its end damaged. In order to preclude such damage, when the magnitude of the driving force is larger than the predetermined value, the pinch rollers 4 are moved toward the left while the guide pipes 5 are contracted and simultaneously the guide pipes 6 are extended to reduce the velocity of the cut bar sections owing to the increased length of the guide pipes 6 and the resulting increased friction, whereby the aforementioned damage to the bar section can be prevented. In other words, as the pinch rollers 4 are moved toward the left, as viewed in the drawing and simultaneously therewith the first guide pipes 5 are contracted or shortened and the second guide pipes 6 are lengthened or extended, the friction for each cut section as it passes through the lengthened guide pipes 6 is increased to prevent the aforementioned damage. On the other hand, if the magnitude of the driving force is less than the predetermined value, the cut bar section might come to rest, for example, midway of the guide pipe 6 which would be the normal consequence with the prior art devices lacking the movable pinch rollers 4 and extensible and contractible guide pipes 5 and 6.

The difficulty as would exist in the latter case is overcome, however, with the arrangement of the present invention by displacing the pinch rollers 4 forwardly along the path of bar sections and contracting the second guide pipes 6 while extending the first guide pipes 5. By doing this, as will readily be understood, the distance between the pinch rollers 4 and rotary guide pipes 7 is reduced ensuring that the bar sections are completely delivered into the rotary guide pipes 7 even when the magnitude of the driving force of the pinch rollers is below the predetermined level.

Having described and shown one embodiment of the invention, it is not to be limited to the details set forth but changes and modifications may be made without departing from the scope of the invention as claimed.

What is claimed is:

1. In a bar mill having a final roll stand, an apparatus for delivering bars onto the cooling bed comprising a switch pipe for changing the delivery path of the bars from the final roll stand to the cooling bed, a flying shear machine 3 for cutting bars delivered from the switch pipe of the mill into sections, a plurality of pinch rollers each controlling the speed of the cut bar sections passing therethrough and adjustable in the positions thereof along the path of cut bar sections, first extensible and contractable guide pipes interposed between said flying shear machine and respective pinch rollers for directing cut bar sections from said flying shear machine to the respective pinch rollers as directed by the switch pipe, trough-like rotary guide pipes mounted on the cooling bed, and second extensible and contractable guide pipes interposed between respective pinch rollers and the rotary guide pipes for directing the cut bar sections from said pinch rollers to said rotary guide pipes whereby upon simultaneous adjustment of the position of the pinch rollers and corresponding contraction and extension of the first and second guide pipes, respectively, the correct stopping position of the cut bar sections within the trough-like rotary guide pipes can be obtained.

2. In a bar mill having a final roll stand, an apparatus for delivering bars onto the cooling bed comprising a flying shear machine for cutting bars delivered from the final roll stand of the mill into sections, a pinch roller adjustable in the position thereof along the path of the cut bar sections and imparting to the cut bar sections a predetermined speed, a first extensible and contractable guide pipe between said flying shear machine and said pinch roller for directing the cut bar sections from the flying shear machine to said pinch roller, a rotary trough-like guide pipe mounted on the cooling bed and a second extensible and contractable guide pipe between said pinch roller and said trough-like rotary guide pipe for directing the cut bar sections delivered from the pinch roller to the rotary guide pipe, whereby upon simultaneous adjustment of the position of the pinch roller and a corresponding contraction and extension of the first and second guide pipes, respectively, the correct stopping position of the cut bar sections within the trough-like rotary guide pipe can be obtained.

References Cited by the Examiner

UNITED STATES PATENTS 873,462  12/1907  Slick _____ 80—51

FOREIGN PATENTS 743,853  1/1956  Great Britain.

CHARLES W. LANHAM, *Primary Examiner.*